United States Patent [19]

Martin

[11] Patent Number: 4,625,633

[45] Date of Patent: Dec. 2, 1986

[54] VENTILATED CORE UNIT FOR SERVICE CONNECTIONS

[75] Inventor: Michael G. Martin, Clinton, N.J.

[73] Assignee: Center Core, Inc., South Plainfield, N.J.

[21] Appl. No.: 767,547

[22] Filed: Aug. 20, 1985

[51] Int. Cl.[4] .......................... B05B 15/12; F23J 11/00
[52] U.S. Cl. ..................................... 98/115.3; 98/31.5;
   55/385 A; 55/470; 55/DIG. 18
[58] Field of Search ............................. 98/31.5, 115.3;
   55/385 A, DIG. 18, 471, 472

[56] References Cited

U.S. PATENT DOCUMENTS

| | | | |
|---|---|---|---|
| 2,334,776 | 11/1943 | King et al. | 98/115.3 |
| 3,366,364 | 1/1968 | Curran | 98/38.5 |
| 3,462,892 | 8/1969 | Meyer | 52/481 |
| 3,698,104 | 10/1972 | Sutton | 434/432 |
| 3,789,747 | 2/1974 | Wasserman et al. | 98/33.1 |
| 3,856,981 | 12/1974 | Boundy | 174/48 |
| 3,941,040 | 3/1976 | Carlson | 55/DIG. 18 |
| 4,015,397 | 4/1977 | Flachbarth et al. | 52/721 |
| 4,227,902 | 10/1980 | Olson | 55/472 |
| 4,353,411 | 10/1982 | Harter et al. | 98/40.19 |
| 4,378,727 | 4/1983 | Doss | 98/33.1 |

Primary Examiner—Ronald C. Capossela
Attorney, Agent, or Firm—Steele, Gould & Fried

[57] ABSTRACT

A central core unit for ventilating and providing utility connections to peripheral workspaces disposed adjacent at least one electrical terminal, includes a cabinet having walls for enclosing the electrical terminal, a workspace fan mounted in a side wall of the cabinet, the workspace fan being operable to draw air from the workspace into a plenum defined by the walls of the cabinet, an air filter mounted in one of the walls of the cabinet, the air filter cleaning air drawn in by the fan and discharging the air back into the workspace and at least one electrical outlet mounted in one of the walls of the cabinet, the outlet providing connection to the electrical terminal through the cabinet.

18 Claims, 4 Drawing Figures

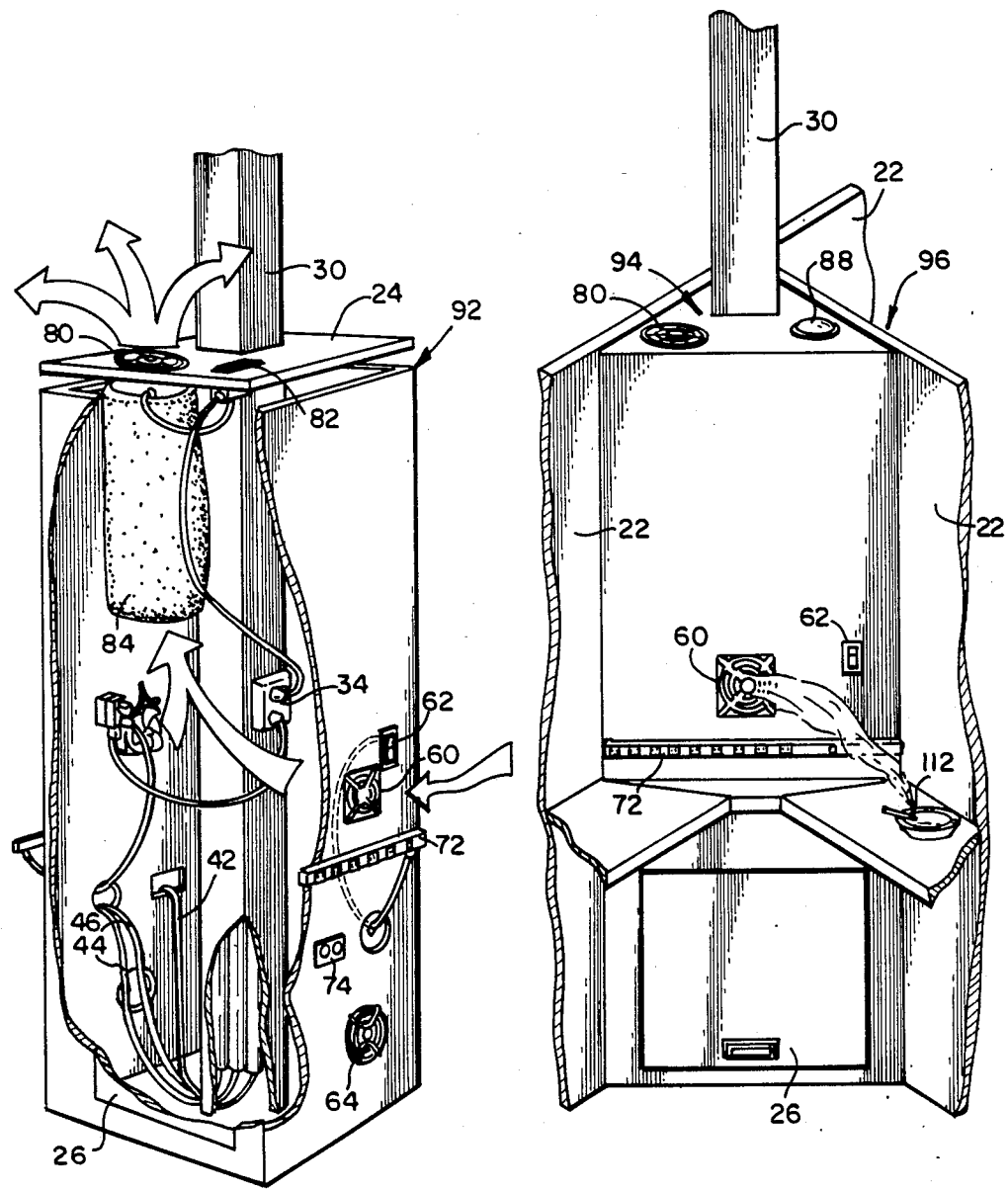

VENTILATED CORE UNIT FOR SERVICE CONNECTIONS

BACKGROUND OF THE INVENTION

1. Field of the Invention

The invention relates to the field of workspace service connections and workspace ventilators, and in particular to a stand-alone workspace unit that provides service connections without any ducted connection to building ventilation equipment.

2. Prior Art

The prior art includes various systems in which service connections are made through modular partitions, desks, and other workspaces. U.S. Pat. No. 4,353,411-Harter et al discloses a system in which heating, ventilation and air-conditioning connections are provided through a central column. Ventilated walls, panels, desks and floors are shown in various U.S. patents, for example, U.S. Pat. Nos. 3,789,747-Wasserman et al (wall panel), 4,015,397-Flachbarth et al (electrical service), and 3,462,892-Meyer (medical utilities). Such devices are useful for providing a convenient connection to utility services which can be shared among adjacent workspaces.

In U.S. Pat. No. 3,856,981-Boundy, electrical lines originating in a hollow ceiling are routed through a central flexible conduit to electrical terminal connections provided in a wall member. That patent discloses electric wires including telephone wires disposed in the conduit to connect a convenient location on the wall panel, adjacent the floor, to such services.

U.S. Pat. No. 3,698,104-Sutton involves a portable study carrel, in which a plurality of angularly-spaced workspaces with table or desk space are defined by partition walls radiating from a central hexagonal column. This device uses the inside of central column to house film projectors. In U.S. Pat. No. 4,378,727-Doss, a system of carrels are provided with ventilation equipment whereby the carrels are connected by means of various ducts to the ventilation system of the building in which the carrels reside.

None of the foregoing disclosures, including Doss, teaches a portable service connection column that is suitable for providing convenient service connections and also ventilation connections that are effective in cooperation with, but otherwise independent of a building's heating, ventilation and air-conditioning systems. None discloses the benefits of an independently controllable zone unit that is not attached to the building HVAC equipment by air ducts.

Modern electronic data processing equipment, although improved over earlier equipment, still releases a substantial amount of heat. Moreover, computers and such equipment are coming into more and more frequent use in office environments of all kinds. Such systems require a number of electrical connections for powering the electronic units and may also need wires for connecting the units to one another such that they communicate together or with a centralized data storage device such as a disc memory. In the aforesaid patent to Harter, a hollow floor houses a connection for building HVAC supply, and U.S. Pat. No. 3,366,364-Curran, a general purpose hollow floor having integral conduits is disclosed. Hollow floors and the like are very useful and effective for housing utility lines and means for communication, especially electrical ones. The drawbacks of the hollow floor arrangement are that the hollow floor represents quite a large expense, and once terminal openings or receptacles are located in the hollow floor, it is normally difficult or impossible to relocate work areas.

A typical office or clerical establishment only seldom has the luxury of substantially refitting its workspace or designing its office space to accommodate future needs for utility connections, data processing communication connections and the like in permanently-installed conduits or hollow floor conduits. Instead, the typical establishment is located in rental property adapted for general purpose use, and not provided with any particular connections or conduit-carrying means.

As data processing terminals become more common, a general purpose office space may find not only its available conduits, but also its ventilation system overpowered. Hollow dropped ceilings are often used instead of hollow floors, to accomodate haphazard electrical routing and the like. Electrical connections that are "dropped" from the ceiling, for example on semi-permanent electrical columns with one or more electrical power receptacles mounted thereupon, are inexpensive and popular for providing power connections. The relative versatility of such power connections contrasts sharply with ducting for ventilation equipment. While additional electrical lines can be run through ceilings, etc., to accommodate additional loads (perhaps with the requirement of upgraded service to permit additional current flow at the incoming utility connection), increases in heating ventilation and air conditioning loads present problems. Adding ducting involves more space and weight than electric wires.

If a business establishment located in an older rental property or a general purpose space desires to install word processing or small computing machinery for some of its work areas, the added generation of heat by these units may possibly overpower the heating ventilation and air-conditioning systems of the building and probably will overpower the system at least in localized areas, for example at word processing sections, in which heating loads are localized.

One cannot readily relocate air ducts in a workspace. The localization of electrical loads precludes practical application of the capacity of a building ventilation system to overcome the localized build up which can occur at concentrations of heat sources. Furthermore, building codes define certain standards for flow and noise in ventilation equipment whereby even if there is space it is often not possible to simply add additional air flow ducts and outlets onto existing ventilation devices. Even though the prior art has arrived at a number of ways of bringing electrical service to localized work areas and has also provided connections to interface workspace to building-wide heating, ventilation and air-conditioning equipment, the need remains to accommodate localized areas of heat build up without unduly multiplying the number of conduits, connections, ducts and access ways around an office.

Considerations of protecting non-smokers from smokers (and vice-versa) suggest that ventilation should be as complete and as individualized as possible. The need to avoid undue ducting and other such ventilation to building heating, ventilation and air-conditioning equipment weighs against the need for individualized ventilators. Some states have not enacted rules and regulations that prohibit smoking in general work areas.

IF smoking is to be allowed, the areas must be ventilated.

A modern trend in office furniture and layout uses small, semi-private working cubicles, which may be occasionally relocated. The cubicles are partitioned using low (5-6 foot) partition panels. Preferably, the workspaces are efficiently small. Unfortunately, these cubicles are even more prone to concentrate and localize heat. Such prior art systems have been less than adequate.

The present invention provides direct electrical utility connections and individually-controllable ventilation for a plurality of workspace cubicles associated with a central core in the form of a hollow vertical column or cabinet. Workers located around a column have individually-controllable fan intakes into the column, to remove excess heat and/or smoke from their workspaces. This ventilation load from the grouped workspaces is centrally-filtered and discharged above the low partition walls defining the workspaces. The centralized discharge tends to mediate and offset local concentrations of heat in the work areas of the group, air at an average temperature being then released into the common ventilated area. The building heating system, which is not directly connected to the ventilation system of the invention, can be operated at a rate according to the average. Inasmuch as no ducted connections need be made to the building heating system, it is not necessary either practically or under the building codes, to increase the airflow capacity of the building system or to change any existing ducting. These benefits are provided with full individual control of the ventilation in individual work areas.

The ventilating center core unit according to the invention is preferably polygonal in plan view, for example triangular, square, hexagonal, octagonal, etc., being attached to ends of vertical partitions extending radially out from the polygon to divide the surrounding area into workspaces. These center core workspaces groupings may be closely spaced adjacent one another and connected to vertical service columns providing electrical, telephone and other power and communications facilities connecting, for example, to the ceiling or floor. On the electrical connections need be centralized, these being made accessible by terminal receptacles, plugs, etc., mounted in the workspaces. Ventilation requirements are individualized at the work stations, and centralized by action of the center core ventilators.

SUMMARY OF THE INVENTION

It is an object of the invention to provide convenient individual area ventilation without appreciably increasing the load to a building ventilation system.

It is also an object of the invention to allow maximum concentration of workspaces without difficulties from concentration of service and utility connections thereto.

It is also an object of the invention to permit workspaces to be relocated at a minimum of inconvenience.

It is another object of the invention to improve the environment of workspaces at minimum expense by providing individualized ventilation and temperature control.

These and other objects are accomplished by a central core unit for locally ventilating and providing utility connections to peripheral workspaces around the core. The workspaces each are provided with electrical terminal devices and air inputs. The core includes a cabinet having walls for at least partly enclosing an electrical supply lines such as a service column. A workspace fan is mounted in a side wall of the cabinet, the workspace fan being operable under user control to draw air from the workspace into a plenum defined by the walls of the cabinet. The air is discharged to a common area above the workspace. An air filter is mounted at one of the walls of the cabinet, the air filter operative to clean air drawn in by the fan and discharged back into the workspace. The terminal devices provide convenient connection to the service column through the cabinet, while the cabinet functions as a local-area ventilation and air filtering unit.

BRIEF DESCRIPTION OF THE DRAWINGS

There are shown in the drawings the embodiments which are presently preferred. It should be understood, however, that the invention is not limited to the precise arrangements, instrumentalities, and combinations of features in the groupings shown in the drawings, wherein:

FIG. 2 is a partially cutaway perspective view of the alternative embodiment of the center core portion.

FIG. 3 is a partially cutaway view of a further alternative embodiment.

DETAILED DESCRIPTION OF THE PREFERRED EMBODIMENTS

Figure 1:
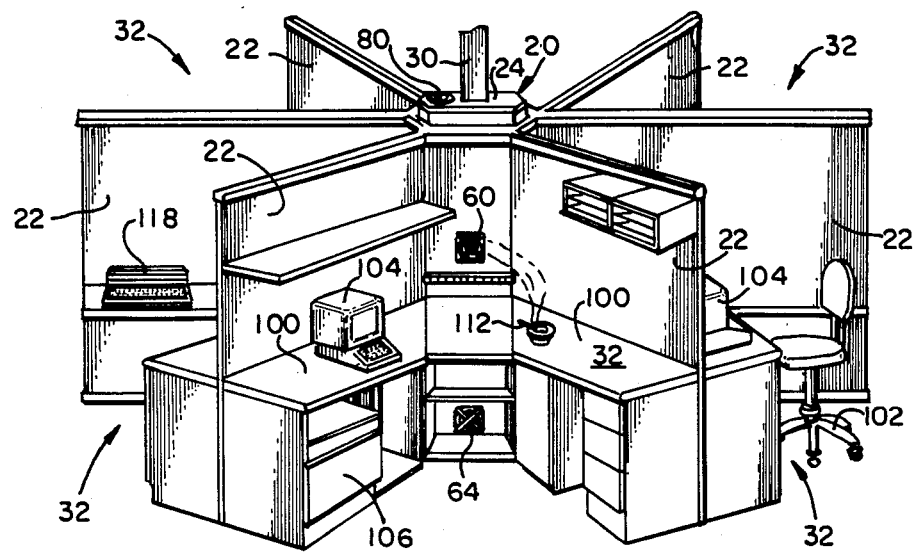
FIG. 1 is a perspective view of a multiple-work-area unit employing the center core of the invention.

FIG. 1 illustrates a multiple work station installation according to the invention. A plurality of work areas 32 are defined by substantially-radial partition members 22, which radiate from a center core unit 20. Core unit 20 is disposed to surround a service conduit 30, which may be a standing pillar carrying electric lines from a hollow ceiling as shown, or may be a standing pillar totally enclosed within the walls 28 and top 24 of core 20.

The core unit of the invention provides a means for distributing service connections, for example connections including clean power 44, "dirty" power 42, and telephone and/or data connections 46. Furthermore, core 20 serves as a localized ventilation unit that serves the work areas 32 that surround core 20, the core unit including powered means for drawing air in through sidewalls 28 of core 20 and exhausting the air, preferably upon filtering, through the top 24 of core 20, above the level of partitions 22.

A variety of configurations for partitioning workspaces are possible. For reasons of efficiency, it is desirable to position the individual work spaces 32 close to one another and close to service conduit 30. It is also desirable for reasons of efficiency and expense, to provide each of the work spaces 32 with all the paraphernalia which will be needed by the worker, including reference materials, supplies of stationery, communications facilities and the like. Therefore, although the particular facilities of each workspace may vary, each generally includes a horizontal workspace 100, low-mounted storage areas 106 and high-mounted shelf units 114.

Localizing all the workers' needs by use of these modular workspace units is efficient for reasons of space and access. Modular workspaces also save time in that the worker can reach any needed equipment from his chair 102. The drawback of the devices is that they inherently confine the workers and their equipment into a relatively small enclosure. Heat which is built up, for example, by data processing terminals 104, electric typewriters 118, and any lights and electrical equipment, as well as the workers' body heat, can build up at individual workspaces 32. Similarly, workers who smoke find that the smoke from their cigarettes 112 will remain in the work area at some concentration. For these reasons, and because the thermal loads produced at individual work stations 32 may vary substantially, it is not readily possible to equalize heating, ventilation and air conditioning requirements for the individual workspaces 32 without some special consideration.

According to the invention, each worker is provided with an individually-controlled ventilation means that interfaces with the center core unit, but does not attach directly to the heating, ventilation and air conditioning (HVAC) duct work of the overall building. The effect of the system is that localized heating loads at individual work stations 32 are accumulated in a plenum defined by the cabinet and converted into a less-localized general thermal load in the area immediately above the partitions 22. The more-generalized load is handled quite nicely by the general building HVAC system. There is no need to interface directly with the system, and no need to route air carrying ducts to the individual workspace groupings.

FIG. 2 is a cutaway illustration of a center core unit that is rectangular or square in plan view. Top 24 is shown lifted slightly from walls 28. Walls 28 and access panel 26 are shown cutaway. In practice, the walls 28 and top 24 define an at least partially sealed plenum into which air is to be drawn by means of individually-controllable fans 60. Fans 60 are turned on and off by switch 62 located in the individual work areas 32. Fans 60 are preferably located at least slightly above the surfaces of desk areas 100, whereby heat from computer terminals, smoke from ash trays, and the like, that would otherwise be trapped under shelf units 114 and other high-mounted storage areas (see FIG. 1) are removed from the work space into the plenum.

An additional air intake 64 may be mounted below the horizontal work area 100. It is believed that the single intake fans 60 located above the horizontal shelf unit is adequate to remove air from the individual workspace 32. The airflow driven by fans 60 is further supplemented by a single plenum-exhausting fan 80, located in top 24. Exhaust fan 80 also has a control switch 82, but there is, of course, only one exhaust fan for all the work spaces associated with a given center core unit 20. Exhaust fan 80 is directly associated with a filter medium 84, preferably a filter medium adapted to remove smoke and particulate matter from the air.

It is currently preferred that intake fans 60 for use in the individual workspaces be approximately 80 cubic foot per minute fans. Both types can be of the panel mount variety, for example those known as "Muffin" fans. The single outlet fan 80 may be a 560 cubic foot per minute ("CFM") fan. Filter 84 is preferably comprised of at least 6 square feet of filter material of a type that is at least 95% efficient at removing particles down to 0.1 microns, thereby effectively removing cigarette smoke from the exhaust. A suitable material is marketed as "Filtreet". The life of filter 84 will, of course, depend upon the number and output of smokers, and the dustiness and air quality of the facility generally.

It is also possible and preferable to provide filters for the individual work stations, for example, charcoal filters mounted immediately behind fans 60, which not only remove particles, but also tend to absorb odors such as perfume, etc.

Connecting apparatus are provided on wall 28 of core unit 20 to provide convenient access to surfaces through the service column 30. The regular 110 volt AC power line, otherwise available at outlet box 34 on the column, is routed by means of regular electric surface plugs and sockets to plug strip 72, and to the switches used to drive the fans 60, 80. It is preferred that the electrical supply line to plug strip 72 be run through a conveniently-openable wire-restricting orifice, allowing the plug strip to be re-positioned by the user, for example along the rear edge of the horizontal desk surface, if necessary.

Services, and connectors, are preferably provided for regular power in plug strip 72, and also for telephone connectors, and data processing connections for supplying clean power and communications capabilities to data processing terminals in each workspace.

The supplied clean power is preferably a separate circuit or group of circuits that are connected only to restricted non-inductive loads. In this manner, voltage spikes that would otherwise appear when initially placing or removing an inductive load from the line are eliminated, and sensitive data processing equipment is protected. Inductive loads may be, for example, motors or electric heaters. Such motors, including the motors driving fans 60, 80, are connected to the regular power lines. The clean power outlets 74 should be labelled clearly, and may be provided with special connectors.

Phone connectors and data communication connectors (not shown) are also preferably provided on wall 28 and wired through column 30 into a hollow ceiling. As noted above, it is also possible to use a service column 30 that does not extend completely from floor to ceiling, instead using a column that extends from the ceiling to top 24 or from a hollow floor upwards. Service columns reaching from floor to ceiling are preferred.

Access panel 26, provided in the wall of at least one of the work stations 32, may be opened as necessary to change filter 84 in the plenum. The user opens panel 26 and stands up inside core 20. The filter is constructed substantially like a bag with an elastic mouth to be fit over the fan. Supporting structure inside the bag, or filter material inside, prevent the bag from collapsing. Access panel 26 may also be located elsewhere, and access may be provided by making top 24 liftable.

FIG. 3 shows an alternative embodiment in which a triangular core 94 replaces square core 92 of FIG. 2 or the hexagonal core of FIG. 1. For the most part, the core elements 20 can be of any polygonal cross section. The triangular device of FIG. 3 has particular advantage in that as shown in FIG. 3, the core unit can be positioned entirely within one of the work areas, leaving rear-side work area 96 of the full size defined by partition panels 22.

FIG. 3 also illustrates the use of the core unit 94 as a mounting for an indirect lighting element 88. Lighting element 88 may be a simple upwardly-directed lamp, whereby lighting to the individual work stations 32 bounces off the ceiling, providing a subdued lighting effect. Light 88 can be wired to come on whenever power is applied to fan 80. Light 88 can alternatively be a safety light that comes on only when power is lost.

Figure 4:
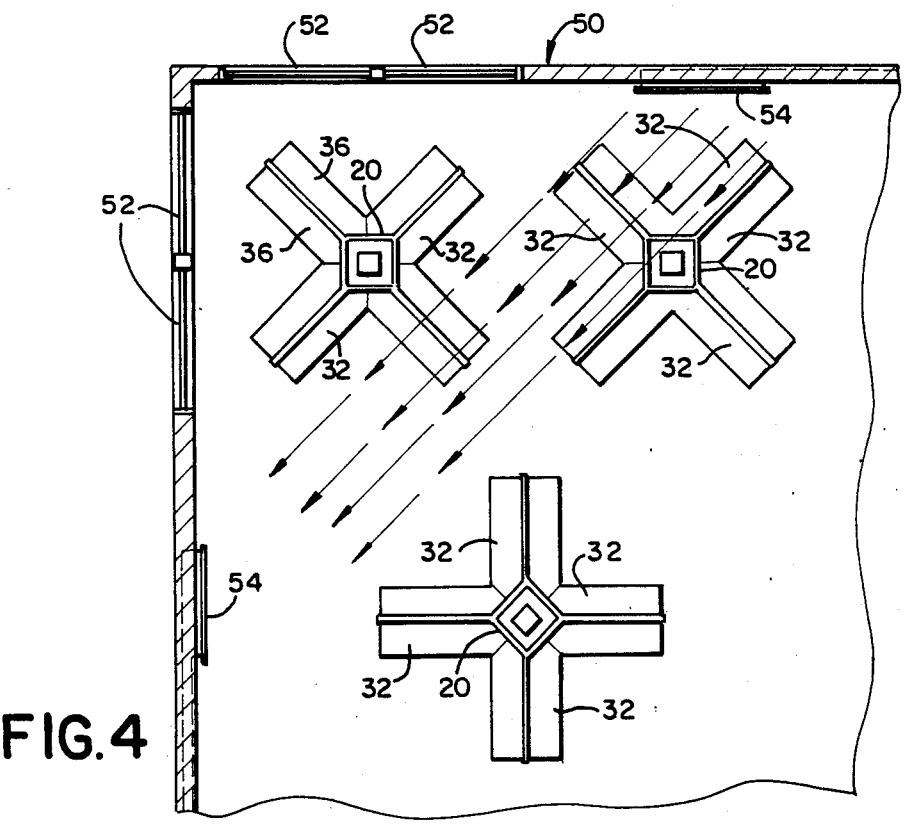
FIG. 4 is a floor plan showing a plurality of core units, work areas and building ventilation features.

The center core units 20 of the invention are effective to provide services to work areas, to ventilate individual work areas, and also to interface the work areas to the building HVAC system. No ducting is required, but the device nevertheless individualizes ventilation requirements. As shown in FIG. 4, windows 52 of building 50 may be disposed such that the heating or cooling requirements of work stations 36, most exposed to the windows, will be different than the requirements of stations 32, which are more remote from windows 52. The core units 20 are positioned at regular spaces in the overall work area, and only certain of the areas 32 are directly exposed to an airflow ventilation path between building ventilation conduits 54. Furthermore, the vertical partitions between the work units prevent any direct flow of air between conduits 54. It is therefore likely that, for example on a sunny summer day, the work stations 32 would be relatively cold, and work stations 36 would be relatively hot. According to the invention, the occupants of these work stations can operate individual ventilation fans 60, and each of the core units 20 has a single output fan 80 and filter, whereby, upon individual control of the occupants of the workspace, any accumulations of heat can be exhausted into the area above the general area of the work stations. This places the heating or cooling load in the general flow path 56 between the building ventilation conduits 54. In this respect, the device of the invention interfaces with the building system, and also provides individualized ventilation for the workspaces.

The invention having been disclosed, a number of additional improvements will now occur to persons skilled in the art. Reference should be made to the appended claims rather than the foregoing specification as indicating the true scope of the invention.

What is claimed is:

1. An apparatus for ventilating and providing utility connections to a workspace, the workspace being defined between a floor and a ceiling and having at least one supply electrical terminal, the apparatus comprising:
   a cabinet having walls at least partly enclosing the supply electrical terminal and partitions attached to the walls and subdividing the workspace into work areas, the cabinet and partitions extending only part way from the floor to the ceiling, a free space being defined above the cabinet and partitions for air flow in the workspace;
   a work area fan mounted in a side wall of the cabinet, the work area fan being operable to draw air from one of the separate work areas into a plenum defined by the walls of the cabinet;
   an air filter mounted in one of the walls of the cabinet, the air filter cleaning air drawn in by the fan and discharging clean air back into the workspace at the free space above the cabinet, the air passing through the cabinet, free space and separate work areas in a circulating ventilation path; and,
   at least one electrical outlet mounted in one of the walls of the cabinet, the outlet providing connection to the electrical terminal through the cabinet;
   whereby the apparatus filters air from the separate work areas and moderates local heat loads in the separate work areas, independent of direct connection to a building HVAC system.

2. The apparatus of claim 1, further comprising an outlet fan disposed on an opposite side of the filter from the workspace fan, the outlet fan being operable to discharge the clean air in to the free space.

3. The apparatus of claim 1, further comprising a plurality of workspace fans and electrical outlets angularly spaced around the cabinet.

4. The apparatus of claim 3, wherein the cabinet is a polygon in cross-section, flat faces of the polygon defining the separate work areas in the workspace.

5. The apparatus of claim 4, wherein the cabinet is an elongated vertical column and the supply electrical terminal is located on an electrical service column disposed within the cabinet.

6. The apparatus of claim 5, further comprising at least one horizontal working surface extending into one of the separate work areas from the cabinet.

7. The apparatus of claim 4, comprising a plurality of workspace fans and electrical outlets, mounted on the flat faces of the polygon for each of the work areas.

8. The apparatus of claim 4, further comprising at least one electrical switch controlling connection of power to at least one of the workspace fans, outlet fan and electrical outlet.

9. The apparatus of claim 4, comprising electrical terminals for electric power and telephone connections to the electrical terminal.

10. The apparatus of claim 9, further comprising at least one electrical terminal for data processing equipment.

11. The apparatus of claim 10, wherein the connection for the data processing equipment is a source of clean electrical power.

12. A core unit for a multi-station workspace having a plurality of work areas disposed around the core unit, the core unit enclosing a central supply electrical terminal, comprising:
   a cabinet having substantially-solid walls enclosing the supply electrical terminal and partitions radiating from the cabinet, the work areas being defined between the partitions;
   a plurality of electrical service connections disposed in walls of the cabinet and connectable to electrical service connections at said terminal; and,
   a circulating ventilation means including the walls of the cabinet defining a closed plenum, a plurality of intake fans disposed at individual work areas and at least one outlet fan discharging air from the plenum into a common area above the work areas, the circulating ventilation means being independent of a building HVAC system, whereby the circulating ventilation means moderates buildup of heat in the work areas.

13. The apparatus of claim 12, further comprising a filter medium disposed in the plenum, the outlet fan forcing air through the filter medium.

14. The apparatus of claim 13, wherein the service connections include telephone, electric power and data processing connections.

15. The apparatus of claim 14, further comprising a plurality of electrical switches connected for independent control of service connections to each of the work areas.

16. The apparatus of claim 15, wherein the cabinet is closed to air flow from sources and discharges other than the intake fans and outlet fan.

17. The apparatus of claim 16, wherein the electrical service connections supplying the cabinet are mounted on a central column.

18. An improved office divider of the type having a plurality of standing partitions radiating from a central cabinet and defining separate work areas in the workspace, the cabinet and partitions being relocatable and extending only part way from a floor of a workspace to a ceiling, the divider to be used in conjunction with a building HVAC system, the improvement comprising:

a circulating ventilation means in the cabinet, including fans operable to intake air from the separate work areas, at least one filter to clean the air, and structure in the cabinet directing cleaned air to an outlet above the cabinet and the partitions;

whereby localized heat in the separate work areas is moderated independent of connections to a central HVAC system and the HVAC system is operable to control temperature based on an average heat in the workspace.

* * * * *

UNITED STATES PATENT AND TRADEMARK OFFICE
CERTIFICATE OF CORRECTION

PATENT NO. : 4,625,633

DATED : December 2, 1986

INVENTOR(S) : Michael G. Martin

It is certified that error appears in the above-identified patent and that said Letters Patent is hereby corrected as shown below:

Column 2, Line 67 "not" should be -- now --

Column 3, Line 44 'On" should be -- Only --

Column 4, Line 35 "center" should be -- central --

Column 6, Line 17 "connectors" should be -- connections --

Signed and Sealed this

Tenth Day of March, 1987

*Attest:*

DONALD J. QUIGG

*Attesting Officer*   *Commissioner of Patents and Trademarks*